United States Patent [19]

Audeh et al.

[11] Patent Number: 5,190,908
[45] Date of Patent: Mar. 2, 1993

[54] A RACKED BED FOR REMOVAL OF RESIDUAL MERCURY FROM GASEOUS HYDROCARBONS

[75] Inventors: Costandi A. Audeh, Princeton, N.J.; Barry E. Hoffman, Duncanville, Tex.

[73] Assignee: Mobil Oil Corporation, Fairfax, Va.

[21] Appl. No.: 719,408

[22] Filed: Jun. 24, 1991

[51] Int. Cl.$^5$ .................. B01J 20/08; B01J 20/28; B01D 53/02; B01D 53/04

[52] U.S. Cl. .................. 502/415; 55/35; 55/72; 55/387; 423/210; 423/230; 502/60; 502/400; 502/407

[58] Field of Search .................. 502/415, 407, 400; 55/387

[56] References Cited

U.S. PATENT DOCUMENTS

| | | | |
|---|---|---|---|
| 3,888,124 | 6/1975 | Campbell et al. | 55/72 |
| 4,094,777 | 6/1978 | Sugier et al. | 210/32 |
| 4,251,495 | 2/1981 | Deschamps et al. | 423/280 |
| 4,834,953 | 5/1989 | Audeh | 423/260 |
| 4,874,525 | 10/1989 | Markovs | 210/673 |
| 4,895,708 | 1/1990 | yan | 423/210 |
| 4,902,662 | 2/1990 | Toulhaot et al. | 502/216 |
| 4,982,050 | 1/1991 | Gammie et al. | 585/818 |
| 4,983,277 | 1/1991 | Audeh et al. | 208/252 |
| 5,053,209 | 10/1991 | Yan | 423/210 |
| 5,120,515 | 6/1992 | Audeh et al. | 423/210 |

FOREIGN PATENT DOCUMENTS 2310795  1/1977  France .................. 423/210

*Primary Examiner*—Paul E. Konopka
*Attorney, Agent, or Firm*—Alexander J. McKillop; Charles J. Speciale

[57] ABSTRACT

The present invention advantageously provides a desiccant bed with means for removing residual mercury from a gas, such as a natural gas stream. The desiccant bed includes a silver and/or gold-containing layer and a protective layer of pellets having an active compound comprising at least one of copper hydroxide, copper oxide and copper sulfide. The active compound provides the desiccant bed with the additional advantage of removing $H_2S$ and $CO_2$ as well as mercury from the gaseous stream. The desiccant bed removes the mercury, $H_2S$ and $CO_2$ without incurring the pressure loss inherent in utilizing a separate downstream adsorbent bed for removing Hg.

11 Claims, No Drawings

A RACKED BED FOR REMOVAL OF RESIDUAL MERCURY FROM GASEOUS HYDROCARBONS

BACKGROUND OF THE INVENTION

The present invention is a method for the removal of residual mercury from gases and a novel desiccant bed useful in practicing that method. The present invention includes removal of moisture, mercury, carbon dioxide and hydrogen sulfide from contaminated gases and a desiccant bed for practicing the new process which is particularly useful as a means for removing moisture and mercury from natural gas prior to liquefaction.

Natural gas which is produced from a natural gas well is usually separated and purified to provide products for a variety of end uses. The high-pressure mixture produced from the well, i.e. the wellstream, is typically sent to a separator vessel or a series of separator vessels maintained at progressively lower pressures where the wellstream is separated into a gaseous fraction and a liquid fraction.

The gaseous fraction leaving the separator, which may contain the impurities mercury, carbon dioxide and hydrogen sulfide, is sent to a gas treatment and purification plant where the mercury concentration is normally reduced to $<0.1$ micrograms/Nm$^3$, the $CO_2$ concentration is reduced to the parts per million (ppm) level, and the $H_2S$ to about one (1) ppm.

The purification of the gaseous fraction is commonly achieved by passing the gaseous fraction over a bed of activated carbon which has been impregnated with sulfur. In this step, the mercury in the gas reacts with the sulfur and is essentially removed from the gaseous fraction. The mercury content of the gas can be reduced from about 250 micrograms/Nm$^3$ or higher to less than about 0.1 micrograms/Nm$^3$.

The gas leaving the sulfur/carbon bed then could be treated with a hot aqueous potassium carbonate solution which has the ability to absorb $CO_2$ and $H_2S$. This step produces a natural gas stream having a reduced $CO_2$ and $H_2S$ content. For example, the $CO_2$ content of the gas can be reduced from about 15% to about 0.3% and the $H_2S$ content from about 80 ppm to about 6 ppm.

The natural gas stream which resulted from treatment with the carbonate solution is further treated in order to reduce the amount of $CO_2$ and $H_2S$ by treating the gas with an amine solution, e.g. an aqueous solution of diethanolamine. Diethanolamine has the ability to absorb $CO_2$ and $H_2S$, and can reduce the $CO_2$ content from about 0.3% to about 50 ppm, and the $H_2S$ content from about 6 ppm to about 1 ppm. The natural gas is then washed with water to remove traces of entrained amine. This water wash, however, neither removes residual mercury, typically present in levels of less than 0.1 $\mu$g/Nm$^3$, nor residual $H_2S$ and $CO_2$, typically about 1 ppmv and 50 ppmv, respectively.

The washed natural gas is water-saturated and has to be dried prior to liquefaction. Usually drying is achieved by contacting the wet gas with a desiccant in a packed bed specifically designed for this purpose. The desiccant bed undergoes repeated cycles of adsorption and regeneration. To ensure that the desiccant bed retains its integrity during the drying and regeneration cycles, a protective layer of inert alumina spheres having a depth of about 0.5–2 ft. is placed over the desiccant. The alumina spheres in the protective layer are somewhat larger than the desiccant particles.

The dried gas, which still contains small amounts of mercury, $CO_2$ and $H_2S$, can be further purified by contacting it with an adsorbent bed comprising sulfur on carbon, which has the ability to selectively remove mercury from the gas. Usually such an adsorbent can reduce the mercury concentration to less than about 0.01 $\mu$g/Nm$^3$. However, including such an additional bed causes a pressure drop in the system, which is undesirable in a system where elevated pressure is required for the maximum efficiency.

Although the Hg content of the gas is reduced by the use of this additional adsorbent bed, its $H_2S$ and $CO_2$ content remain unchanged at about 1 and 50 ppmv respectively. In a liquefaction process, the temperature required to liquefy methane is 109° K, i.e. $-164$° C., which is well below the freezing point of $CO_2$. Thus, in time, $CO_2$ can accumulate in the cold parts of a liquefaction train and can cause plugging which is undesirable. Although $H_2S$ is present in lesser amounts than the $CO_2$, its freezing point, 187° K, i.e. $-86$° C., is also well above the 109° K, which means that any $H_2S$ in the gas will become a solid at the conditions of the liquefaction process which can add to the plugging problem.

Thus, it would be beneficial to provide a mechanism for further reducing the level of residual mercury from the gas leaving the desiccant bed without the pressure reduction which usually results from using a second adsorbent bed. It would also be very desirable to remove $CO_2$ and $H_2S$ from the gas to reduce the risk of plugging.

It is therefore an object of the present invention to provide an improved method for reducing residual levels of mercury from a gas stream.

It is a further object of the present invention to provide an improved method for purifying natural gas and a packed bed containing a desiccant therefor which not only reduces residual levels of mercury from the natural gas but also reduces moisture and residual levels of $CO_2$ and $H_2S$ from the gas.

SUMMARY OF THE INVENTION

The present invention advantageously provides a conventional packed bed containing a desiccant with means for removing residual mercury, $H_2S$ and $CO_2$ from a gas, such as a natural gas stream, by providing a porous silver and/or gold-containing layer, and an inert protective layer, e.g. of alumina pellets, with an active compound having at least one of copper hydroxide, copper oxide and copper sulfide. The active compound provides the desiccant bed with the additional advantage of removing $H_2S$ and $CO_2$ as well as mercury from the gaseous fraction without incurring the pressure loss inherent in utilizing a separate downstream adsorbent bed for removing Hg.

For a better understanding of the present invention, together with other and further objects, reference is made to the following description and its scope will be pointed out in the appended claims.

DETAILED DESCRIPTION

It has been found that directing a gas stream containing residual amounts of mercury through a porous silver and/or gold-containing layer efficiently removes residual amounts of mercury. In addition, it has been found that alumina impregnated with copper hydroxide or with copper oxide reacts with hydrogen sulfide to form copper sulfide. It has also been found that copper sulfide can be used to remove mercury from natural gas.

Moreover, $CO_2$ can react with copper oxide and copper hydroxide at relatively high pressures to form copper carbonate. Copper carbonate is thermally unstable and decomposes at 200° C. to give off $CO_2$.

The present invention utilizes these phenomena in providing an improved gas purification procedure for the removal of mercury from natural gas. Specifically, the present invention takes advantage of the ability of silver and/or gold to react with mercury, the ability of copper oxide and copper hydroxide to react with hydrogen sulfide and carbon dioxide, the ability of copper carbonate to thermally decompose at about 220° C. and the ability of copper sulfide to remove mercury from a gaseous stream. The present invention also takes advantage of the ability to regenerate copper sulfide which is used to remove the mercury from the gas stream at the temperature of desiccant regeneration.

In accordance with the present invention, there is provided a desiccant bed which can simultaneously remove residual mercury and moisture from a gas stream contacting the bed. The packed bed containing a desiccant includes at least one porous silver and/or gold-containing layer. Both silver and gold have the ability to remove mercury from a gas stream by amalgamation. The mercury present in the gas stream becomes an amalgam with the silver and/or gold-containing layer as the gas stream passes through. The amalgamated mercury in the silver and/or gold-containing layer is then removed during desiccant regeneration.

The porous silver and/or gold-containing layer may be in the form of a screen woven from silver containing and/or gold-containing wire. The screen is woven to from about 4 to about 80 size mesh, preferably from about 10 to 30 size mesh and most preferably into a screen having about a 20 size mesh. Alternatively, the porous silver and/or gold-containing layer may be in the form of loosely packed silver and/or gold wire or silver and/or gold "wool". A key to the method of the present invention and apparatus therefor, however, is that the silver and/or gold-containing layer is porous and can allow a gas stream to pass through without incurring a pressure drop which is inherent when utilizing separate and additional downstream mercury removal beds.

The porous silver and/or gold-containing layer may be composed of more than one type of the above-described porous silver-containing elements. For example, the porous silver and/or gold-containing layer may include a silver-containing screen, a gold-containing screen and/or loosely packed silver wire or "wool", gold wire or "wool" and/or other forms of porous silver and/or gold-containing materials. The porous silver and/or gold layer may be disposed above and/or below the desiccant in the desiccant bed. In a preferred embodiment, however, the desiccant bed includes both a porous silver and/or gold layer disposed above the desiccant as well as another porous silver and/or gold layer disposed below the desiccant.

According to one embodiment of the present invention, the protective layer of inert alumina pellets or spheres, which are usually placed on top of a desiccant bed to ensure that the desiccant bed retains its integrity during drying and regeneration, are replaced with alumina pellets or spheres which have been individually impregnated with at least one of copper hydroxide, copper oxide, or copper sulfide. A porous silver and/or gold-containing layer may then be placed above the alumina pellets or spheres.

While alumina in the form of pellets is a preferred substrate of the present invention, other substrates may also be utilized including silica, silica-alumina, molecular sieves, silica gels, and combinations thereof. The desiccant of the present invention may comprise any solids which have the ability to adsorb water and release it upon heating to regenerate the desiccant, as well as to withstand the regeneration temperatures described below.

These reactive substances, namely the copper hydroxide, copper oxide, and copper sulfide are most preferably impregnated into separate pellets. Thus, some of the pellets will be treated with copper hydroxide while others will be treated with copper oxide, and still others will be treated with copper sulfide. While it is preferred that the entire protective layer of alumina pellets is treated with one or more of these reactive substances, some of the pellets may be left untreated leaving some inert pellets in the protective layer.

Any known method for impregnating the porous substrate with these active compounds may be utilized. For example, the copper hydroxide impregnated alumina pellets may be prepared by thoroughly mixing 30 parts by weight of alumina (dry basis) with 8 parts copper hydroxide and 62 parts of deionized water, extruding the mixture through a ¼ inch dieplate and drying at 120° C. The copper oxide impregnated pellets may be prepared by heating the copper hydroxide impregnated pellets to 400° C. The copper sulfide impregnated pellets may be prepared by reacting the copper hydroxide impregnated pellets with gaseous hydrogen sulfide. The present invention is not limited by the manner in which the active compounds are impregnated onto a substrate.

When copper oxide is added to a substrate, it is preferably added in an amount of about 10–20% by weight of said substrate, most preferably about 12–18%. Similarly, copper hydroxide is preferably added in an amount of about 10–30% by weight based on the weight of the substrate, and most preferably in an amount of about 15–20% by weight. Lastly, when copper sulfide is utilized, it is preferably added in an amount of 10–20% by weight of the substrate, most preferably in an amount of about 12–18% by weight.

While the active compounds of the present invention are preferably impregnated into a porous substrate, these compounds may be dispersed on a non-porous substrate or may even be formed into hardened pellets themselves and placed on top of the desiccant bed. Suitable porous substrates include alumina, silica-alumina, silica gel, molecular sieves and other porous substrates known in the art. Those skilled in the art will also appreciate that certain porous substrates will also provide the added advantage of having the ability to absorb some moisture from the moisture-containing gas thereby supplementing the dehydration performed by the desiccant.

According to one preferred embodiment of the present invention, the ratio of each type of pellet, in other words the ratio of pellets treated with copper hydroxide to the number treated with copper oxide to the number treated with copper sulfide is about 1:1:1. However, other ratios are possible without departing from the scope of the present invention.

Copper sulfide has the ability to remove mercury from natural gas to about the same purity level as other mercury removal materials while allowing the adsorbed mercury to be stripped off during the desiccant regeneration cycle (heating with a gas sweep to about 500–700°

F). Hence, the copper sulfide is periodically and simultaneously regenerated with the desiccant. Thus, in addition to supplying integrity to the desiccant bed, the CuS-impregnated alumina spheres remove mercury from the gas, without the requirement for an additional specially designed adsorbent bed with its additional inherent pressure drop. The copper hydroxide and copper oxide not only have the ability to react with $CO_2$ and $H_2S$ and remove them from the gas, but by forming copper sulfide, also assist in reducing the level of mercury in the gas.

The present invention advantageously does not require substantial changes to a conventional gas treatment process. The benefits of the present invention may be obtained while supplying the contaminated, moisture-containing natural gas into the desiccant bed at a pressure of about 1–100 atmospheres, at a temperature of about 50°–120° F. and at a space velocity of about 1–300. Most preferably, the contaminated, moisture-containing gas is fed into the desiccant bed at a pressure of about 20–60 atmospheres, a temperature of about 60°–110° F., and at a space velocity of about 100–200. Those skilled in the art will appreciate that the space velocity is defined as the volume of gas passing through the desiccant bed every hour divided by the volume of the desiccant bed. As used herein, the volume of the desiccant bed is considered to be the sum of the volume of the desiccant and the total volume of pellets whether treated with one of the above mentioned active compounds or untreated and left in an inert state.

As mentioned above, the desiccant bed can be regenerated by passing a gas such as methane, ethane or propane, through the desiccant bed at a temperature of about 400°–700° F., most preferably at a temperature of about 600° F. This regeneration step advantageously decomposes accumulated copper carbonate into carbon dioxide and copper oxide. The carbon dioxide is also advantageously carried away with the regenerating gas while the copper oxide remains in the alumina pellets for future use in removing contaminants from the natural gas.

The present invention is preferably used in a natural gas purification plant, the desiccant bed of the present invention may also be utilized in the treatment of other gases such as hydrogen, ethylene, etc.

While there have been described what are presently believed to be the preferred embodiments of this invention, those skilled in the art will realize that changes and modifications may be made thereto without departing from the spirit of the invention, and it is intended to claim all such changes and modifications as fall within the true scope of the invention.

What is claimed is:

1. A packed bed for removing moisture and mercury from a gas at a temperature range from about 50° F.–120° F., the packed bed comprising:
   (a) a layer of desiccant particles;
   (b) a porous layer containing an element selected from the group consisting of silver, gold and mixtures thereof; and
   (c) at least one protective layer of pellets or spheres for maintaining the integrity of the packed bed, said pellets or spheres being larger than the desiccant particles and comprising an inert substrate onto which an active compound selected from the group consisting of copper oxide, copper hydroxide and copper sulfide is impregnated.

2. A packed bed according to claim 1, wherein said protective layer comprising a first porous substrate comprising alumina and copper oxide in an amount of about 10–20% by weight of said alumina, wherein said protective layer is capable of removing $H_2S$ and mercury from a gas passing through the packed bed.

3. A packed bed according to claim 1, wherein said protective layer comprising a second porous substrate comprising alumina and copper hydroxide in an amount of about 10–30% by weight of said alumina, wherein said protective layer is capable of removing $CO_2$, $H_2S$ and mercury from a gas passing through the packed bed.

4. A packed bed according to claim 1, wherein said protective layer comprising a third porous substrate comprising alumina and copper sulfide in an amount of about 10–20% by weight of said alumina, wherein said protective layer is capable of removing mercury from a gas passing through the packed bed.

5. A packed bed according to claim 1, wherein said protective layer is disposed above said desiccant and includes copper hydroxide and one other active compound selected from the group consisting of copper oxide and copper sulfide impregnated on said inert substrate.

6. A packed bed according to claim 5 wherein said porous layer is disposed above said protective layer.

7. A packed bed according to claim 1 comprising a first protective layer comprising alumina and copper oxide in an amount of about 12–18% by weight of said alumina;
   a second protective layer comprising alumina and copper hydroxide in an amount of about 15–20% by weight of said alumina;
   and a third protective layer comprising alumina and copper sulfide in an amount of about 12–18% by weight of said alumina.

8. A packed bed according to claim 1 wherein said desiccant is selected from the group consisting of silica gel, molecular sieves, and combinations thereof.

9. A packed bed according to claim 1 wherein said protective layer is disposed above said desiccant.

10. A packed bed according to claim 1 wherein said protective layer is disposed below said desiccant.

11. A packed bed according to claim 1 wherein said desiccant bed further comprises a first protective layer disposed above said desiccant and a second porous layer disposed below said desiccant.

* * * * *